(12) United States Patent
Gorga et al.

(10) Patent No.: US 9,652,285 B2
(45) Date of Patent: May 16, 2017

(54) EFFECTIVE ROAMING FOR SOFTWARE-AS-A-SERVICE INFRASTRUCTURE

(71) Applicant: International Business Machines Corporation, Armonk, NY (US)

(72) Inventors: Ilaria Gorga, Rome (IT); Sandro Piccinini, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 14/750,988

(22) Filed: Jun. 25, 2015

(65) Prior Publication Data

US 2016/0026497 A1   Jan. 28, 2016

(30) Foreign Application Priority Data

Jul. 23, 2014   (GB) .................................. 1413016.5

(51) Int. Cl.
| | | |
|---|---|---|
| *G06F 15/173* | (2006.01) | |
| *G06F 9/48* | (2006.01) | |
| *H04L 29/08* | (2006.01) | |
| *H04W 4/00* | (2009.01) | |

(52) U.S. Cl.
CPC ............ *G06F 9/4856* (2013.01); *H04L 67/10* (2013.01); *H04L 67/327* (2013.01); *H04W 4/003* (2013.01); *G06F 2209/5015* (2013.01)

(58) Field of Classification Search
CPC .................. G06F 9/4451; G06F 9/4856; G06F 2209/5015; H04L 67/10; H04L 67/327; H04W 4/003
See application file for complete search history.

(56) References Cited

U.S. PATENT DOCUMENTS

| | | | |
|---|---|---|---|
| 7,574,496 B2 | 8/2009 | McCrory et al. | |
| 8,271,655 B2 * | 9/2012 | Dawson | G06F 9/4856 |
| | | | 709/226 |
| 8,909,780 B1 | 12/2014 | Dickinson et al. | |
| 2011/0039518 A1 * | 2/2011 | Maria | H04L 12/66 |
| | | | 455/406 |
| 2012/0137003 A1 | 5/2012 | Ferris et al. | |
| 2012/0137287 A1 | 5/2012 | Pang et al. | |
| 2013/0080613 A1 | 3/2013 | Thireault | |

(Continued)

FOREIGN PATENT DOCUMENTS

WO    WO2014120534 A1    8/2014

OTHER PUBLICATIONS

United Kingdom Intellectual Property Office Search Report, dated Jan. 26, 2015, regarding Application No. GB1413016.5, 3 pages.

*Primary Examiner* — June Sison
(74) *Attorney, Agent, or Firm* — Heather S. Chatterton

(57) ABSTRACT

A method for providing a roaming service to a first client may be provided. The first client may be associated to at least one application service running on an associated virtual machine as a Cloud service via a primary route between the first client and the at least one application service. The method may comprise providing a first agent on the first client, and providing an alternative route to the primary route between the first client and the at least one application service utilizing a second agent running on a second client. Thereby, the alternative route is based on a set of preferences submitted by the first client.

13 Claims, 4 Drawing Sheets

```
100
  ↓

┌─────────────────────────────────────────────┐
│ 102   providing a first agent on a first client │
└─────────────────────────────────────────────┘
                      │
┌─────────────────────────────────────────────┐
│      104   providing an alternative route       │
│             utilizing a second client           │
│   based on a set of preference submitted by the │
│                  first client                   │
└─────────────────────────────────────────────┘
```

(56) References Cited

U.S. PATENT DOCUMENTS

| | | | |
|---|---|---|---|
| 2013/0132854 A1* | 5/2013 | Raleigh | G06F 3/0482 715/738 |
| 2014/0075518 A1* | 3/2014 | D'Souza | H04L 63/00 726/4 |
| 2014/0086177 A1* | 3/2014 | Adjakple | H04W 12/08 370/329 |
| 2014/0108665 A1* | 4/2014 | Arora | H04L 67/141 709/227 |
| 2015/0172993 A1* | 6/2015 | Jiang | H04W 40/20 455/406 |
| 2016/0044035 A1* | 2/2016 | Huang | H04L 63/0272 726/4 |

* cited by examiner

100

102 providing a first agent on a first client 104 providing an alternative route
utilizing a second client
based on a set of preference submitted by the
first client

EFFECTIVE ROAMING FOR SOFTWARE-AS-A-SERVICE INFRASTRUCTURE

CROSS-REFERENCE TO RELATED APPLICATION(S)

This application claims the benefit of priority to United Kingdom Patent Application No. GB 1413016.5, filed Jul. 23, 3014, the entire contents of which are incorporated herein by reference.

FIELD OF THE INVENTION

The invention relates generally to a method for providing a roaming service to a first client in a SaaS environment. The invention relates further to a related roaming system, a data processing program, and a computer program product.

BACKGROUND OF THE INVENTION

Nowadays many enterprises aim to reduce the business cost associated to IT infrastructure and at the same time trying to convert capital expenses into operational expenses that provide more flexibility and control on the software.

In this environment, many software vendors are providing alternative solutions providing their customers not only with software releases to be installed on the premises of their customers but also delivering their software offerings as a service solution (SaaS=Software as a Service) in which the core of the software product is hosted in a centralized Cloud data center or Cloud computing environment with a limited need of installations on the customer site. Typically, the only requirement may be an agent to be installed on the client side to work and communicate with the central (Cloud) infrastructure.

Typically, these offerings provide the Cloud infrastructure which may be relatively close in a geographical sense to the customer site for performance optimization to reduce network latency and optimize the user experience, and also for an easier management of offering maintenance windows. So, if for example, an Italian customer requires a new offering instance of the Cloud infrastructure, it may be created in an Italian or at least European datacenter in order to optimize the solution performance and reliability and also to comply with legal restrictions.

The problem which may happen in such a client/server approach is that the client node, which is maintained on the customer premise, may change its location, with a potential impact on the software offering's reliability and performance. Moreover, it may also happen that communication problems occur between the client and the server in the Cloud and an alternative communication root may be required, especially, if the client or client computer running the agent in communication with the Cloud datacenter is moved to a different continent.

Several approaches to Cloud computing environments and service access have been described. E.g., document U.S. Pat. No. 8,271,655 B2 describes a system and method to provide Cloud roaming services. The system allows Cloud services to be offered to requesters that are abstracted from the underlying Cloud provider used to fulfill those services. The described system provides the ability for Cloud providers to be dynamically associated with currently available Cloud services for requesters.

Document US 2013/0080613 A1 discloses a method of dynamically routing requests within multiple Cloud computing networks. The method includes receiving a request for an application from a user device, forwarding the request to an edge server within a content delivery network (CDN), and analyzing the request to gather metrics about responsiveness provided by the multiple Cloud computing networks running the application. The method further includes analyzing historical data for the multiple Cloud computing networks regarding performance of the application, based on the performance metrics and the historical data, determining an optimal Cloud computing network within the multiple Cloud computing networks to route the request, routing the request to the optimal Cloud computing network, and returning the response from the optimal Cloud computing network to the user device.

However, mobile computers connect to networks frequently from different access points and potentially also from different geographies. Therefore, there is a need to optimize roaming for SaaS services within service level agreements.

SUMMARY OF THE INVENTION

This need may be addressed by a method for providing a roaming service to a first client, a roaming system, a data processing program, and a computer program product, according to the independent claims.

According to one aspect, a method for providing a roaming service to a first client may be provided. The first client may be associated to at least one application service running on an associated virtual machine as a Cloud services via a primary route between the first client and the at least one application service. The method may comprise providing a first agent on the first client, and providing an alternative route to the primary route between the first client and the at least one application service utilizing a second agent running on a second client, wherein the alternative route may be based on a set of preferences submitted by the first client.

According to another aspect, a roaming system for providing a roaming service to a first client may be provided. The first client may be associated to at least one application service running on an associated virtual machine as a Cloud service via a primary route between the first client and the at least one application service. The roaming system may comprise a first and a second client, both running an agent. The roaming system may also comprise a routing module adapted for providing an alternative route to the primary route between the first client and the at least one application service utilizing the second agent running in the second client, wherein the alternative route may be based on a set of preferences submitted by the first client.

It may be noted that the first client may be one out of a plurality of clients related to the at least one application service. Each of the clients may be related to the same at least one application service. All client systems may run an identical agent related to the application service.

DETAILED DESCRIPTION

It may be noted that in a typical Cloud computing environment a plurality of clients may access the application service on the associated virtual machine running on a first server. A complete SaaS application may comprise a plurality of application services. Also on the server-side, there may be a plurality of servers alongside the first server for availability and other reasons. One could name such a set of first servers a virtual first server running in one or more datacenters. However, to the outside world—in particular to the clients accessing the services of the first server—all first servers may appear as one server.

In the context of this description, the following conventions, terms and/or expressions may be used:

The term "roaming service" may here denote a service providing continued access to a central server and its services from a client system. The term may be used in an equivalent way roaming is understood in cellular (wireless) telephone systems. Roaming helps to ensure that a traveling client can be reconnected to a network and finally to its primary server.

The term "first client" may denote a computing device like a desktop PC, a notebook computer, a tablet computer, a smart phone and the like being adapted to run an agent that is connectable to a SaaS application via a network.

The term "application service" may here denote a service in the sense of Software-as-a-Service (SaaS). The service may run on a virtual machine in a data center on a physical server. The application services are provided to a service consumer which is using the provider's application(s) running on a cloud infrastructure. The applications are assessable from various client devices through a thin client interface such as a Web browser (e.g., Web-based email). The consumer does not manage or control the underlying Cloud infrastructure including network, servers, operating systems, storage, or even individual application capabilities, with the possible exception of limited user-specific application configuration settings.

The term "virtual machine" may denote a software-based emulation of a physical computer. Virtual machines operate based on the computer architecture and functions of a real or hypothetical computer. SaaS systems, as part of Cloud computing solutions, typically run on virtual machines. Virtual machines run typically on a hypervisor running on the physical hardware.

The term "Cloud services" may denote a service delivered from a server to a client under the assumption of the rules of Cloud computing: delivered in a) a one-to-many-mode, b) over the Internet, c) as application in a Web browser, d) in a virtual environment using a virtual machine. Generally, Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is composed of five essential characteristics, three service models, and four deployment models. The essential characteristics comprise on-demand self-service, broad network access, resource pooling, rapid elasticity and measured service. The service models comprise Software-as-as-Service, Platform-as-a-Service (PaaS), Infrastructure-as-a-Service (IaaS). The deployment models comprise a private Cloud model, a community Cloud, a private Cloud, and a hybrid Cloud.

The term "primary route" may denote a physical route of choice for the connection between a client and a server. It may deliver optimal bandwidth if positioned geographically relatively close to the position of the client. Typically, the client and the server may be located in the same country or at least on the same continent. Experience shows that connections between clients and server being positioned in different geographies/continents often experience less bandwidth. This may be in conflict with service level agreements between the client and the server.

The term "agent" may denote a software application installed and running on a client. The agent may be dedicated to communicate with the SaaS server and deliver the application service to a user of a client computer. The agents on different clients may also be adapted to communicate between each other being instrumental for providing optimal routes to the primary server of the application service related to the agent and the client computer, respectively.

The term "alternative route" may denote a route via alternative or other computer systems than a primary route which may, e.g., be used as standard connection between a client and a server. The primary route may be selected automatically by an Internet provider to which network services a client may be connected to.

The term "roaming device" may denote a computer or server via which a connection from a client to a server may be provided. The roaming device may not be involved in any service delivery apart from network connections. If the communication between the client and the server may be encrypted, the roaming device may not have access to the content of the messages passed from the client to the server and vice versa.

The term "proxy" may denote a proxy server—e.g., a computer system or an application—that may act as an intermediary for requests from a client seeking resources from a server. A client may connect to the proxy server, requesting some service, such as a file, connection, web page, or other resources available from a different server and the proxy server evaluates the request as a way to simplify and control its complexity. Originally, proxies were introduced to add structure and encapsulation to distributed systems. Today, most proxies are web proxies, facilitating access to content on the World Wide Web and providing anonymity.

The term "roaming daemon" may denote a software application adapted to communicate with other roaming daemons on other servers and network services. It may manage preferences for clients and its communication to an application service. This may also comprise a service level definition in the form of a service level agreement (SLA). Roaming daemons may run on each virtual machine of a server. The roaming daemon may be connectable to a service dispatcher installed on clients alongside with the agent. It may also be part of the agent.

The proposed method for providing a roaming service to a first client may offer a couple of advantages:

Service level agreements may be defined from two perspectives: a) from the customer/client side, but also b) from the software vendor side. It may be possible to restrict access to servers only to clients from one defined geographical region. It may also allow to route connections between the SaaS server and the client only through data centers (or offer an instance in a single datacenter) of a defined vendor or service provider. Other optimization aspects may also be reflected. Only server instances that guarantee a certain throughput or performance may be selected for the connection to others that offer highly secure connections. Different service level agreements (SLA) may be reflected, e.g., one for each client.

It may also be possible to compensate workloads delivered by different datacenters against each other. And the infrastructure in form of clients receiving software service from one vendor may be leveraged. Overall, a better utilization of available systems as part of the Cloud computing environment may be achieved under the defined constraints of the SLAs and under optimizing the user experience.

Additional advantages and in some cases features of the proposed solution may comprise the capability for a generic Cloud application to host 'additional services', the capability for a Cloud application to realize change in connection to its client, the capability for a Cloud application to notify another Cloud/Cloud application of its client's presence, the capability for the Cloud application to reserve space to host services, broadcast request of services loaning, rank the availabilities to fulfill the request, the capability for the Cloud application to accept loaning to comply with its SLAs and bill the service appropriately, the capability to manage the service hosting at different levels of security based on the vendor of the service or dynamic trusted group of Cloud/vendors/applications.

According to one embodiment of the method, the alternative route may be used if the primary route does not comply with the set of preferences which are service level constraints. The set of preference may, e.g., comprise a predefined overall response time from a client perspective. If the primary route or communication route may not comply with such predefined overall response time, an alternative route may be used instead of the primary route.

According to another embodiment of the method, providing the alternative route may comprise using a second roaming device not running the at least one application service and the associated virtual machine. The application service may only be delivery by a primary server. The roaming device may not deliver active application services to the client in question. However, the server acting as roaming device to the first client may be the base of a different SaaS offering. A plurality of servers may act as roaming devices. All roaming devices may belong to a network operating as private virtual network (PVN) or in a transparent LAN mode.

According to a further embodiment of the method, the set of preferences may comprise rules for quality of service. The quality of service may, e.g., be classified into categories like, in particular gold, silver, and bronze associated with different predefined service categories for a communication between the first client and the associated application service. The quality of service definitions may—in a simple form—comprise guaranteed response time from the server to the client. However, also more complex SLAs may be defined, like compression rates, security standards, a usage of roaming devices only from one vendor, a roaming service only from one network provider, etc.

According to one additional embodiment of the method, wherein the second client—in particular agents running on the second client—may be adapted to operate as proxy for a route between the first client and the at least one application service. This way, agents of the same application service—in particular, the same SaaS package from the same vendor—may support each other in finding alternative routes to the primary server. Alternatively, the agent may also belong to a different SaaS package of the same vendor. If the first client may be operated in a different geography than normally, and if a second client/agent may also be operated in this different geography, the second agent may help the first agent to find the optimal route to its primary server. The SaaS application service of the second client may be delivered by a second server. However, it may be noted that the second server will not become the Cloud service delivery server for the first client but only act as roaming device to establish a connection between the first client and its primary server established. Of course, a plurality of roaming devices/servers may be involved in the alternative route.

According to an enhanced embodiment of the method, the second server and a server running the associated virtual machine executing the application service may run a roaming daemon. Here, the server running the associated virtual machine executing the application service may be the primary server for the virtual machine executing the application service. The roaming daemons may act as a virtual backbone between the servers being involved in getting an alternative route established. All second servers may reflect the set of preferences—in particular service level definitions—in the same way the second client reflects this set of preferences in order to find an alternative route.

According to a further enhanced embodiment of the method, the roaming daemon may use a profile comprising at least one out of a trusted vendor list, a reserved computation volume, an engagement type, a billing threshold for networking services delivered, a security level and others. According to the profile, different servers or networks as routing servers or routing networks may be selected to establish the alternative route.

According to one additionally enhanced embodiment of the method, the first server and the second server may deploy each a counter for counting routing services provided for alternative routes of potentially different clients. Thus, it may be determined how many roaming sessions may have been established by each server. Alternatively, also connection time or data volume transferred may be used as calculation basis. A compensation procedure may be established between the first server and the second server—in particular, the constituents owning the servers—such that only for the server owner of the server having delivered more roaming sessions get a commercial compensation for the roaming service. This may be relevant if the involved servers belong to different owners.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

BRIEF DESCRIPTION OF THE DRAWINGS

Preferred embodiments of the invention will now be described, by way of example only, and with reference to the following drawings:

FIG. 1 shows a block diagram of an embodiment of the inventive method;

DETAILED DESCRIPTION OF EXEMPLARY EMBODIMENTS

In the following, a detailed description of the figures will be given. All instructions in the figures are schematic. Firstly, a block diagram of an embodiment of the inventive method for providing a roaming service to a first client is given. Afterwards, further embodiments of the method and the associated system will be described.

FIG. 1 shows a block diagram of an embodiment 100 of the method 100 for providing a roaming service to a first client running an agent. The first client is associated to at least one application service running on an associated virtual machine as a Cloud service via a primary route between the first client and the at least one application service. The method may comprise providing, 102, a first agent on the first client, and providing 104 an alternative route to the primary route between the first client and the at least one application service utilizing a second agent running on a second client. Thereby, the alternative route may be based on a set of preferences submitted by the first client.

The agent may be a software application delivering, e.g., the application service to a user of the client. Thus, it may, e.g., provide communication services, rendering services and/or security services.

Figure 2:
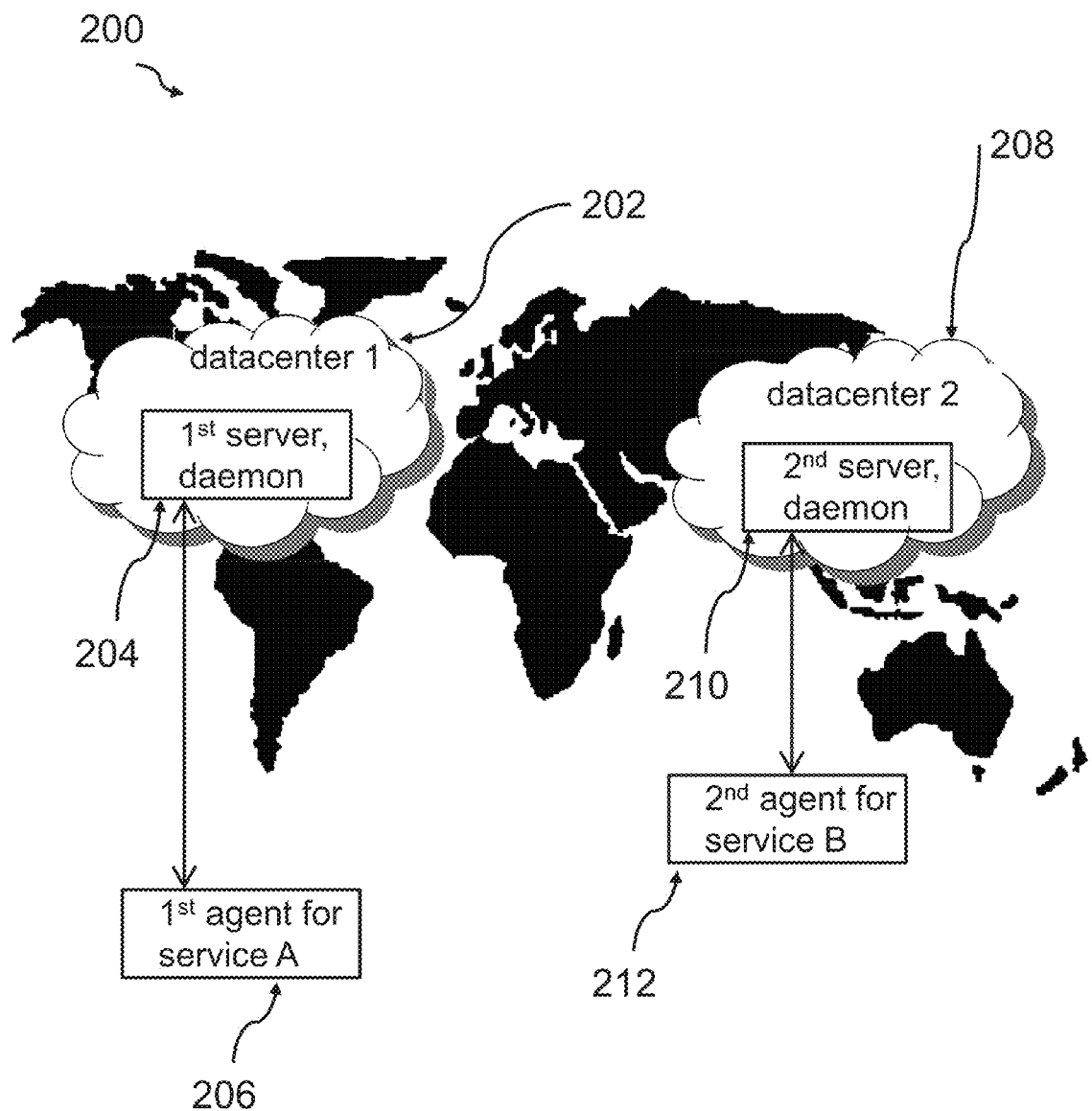
FIG. 2 shows a block diagram of an arrangement of clients and servers in normal mode.

FIG. 2 shows a block diagram 200 of an arrangement of clients and servers in normal mode. In a first datacenter 202, e.g., located on the North American continent, may run a virtual machine providing a basis for an application service. The virtual machine may run on a first server 204. A first agent 206 may be connected, e.g., via the Internet to receive services from the application service. The first server may also run a roaming daemon which may be installed on each VM instance on the first server, that will be responsible both, for the definition of local update policies and for an interaction with other roaming daemons, e.g., running on the second server 210 in a different, second datacenter 208 to optimize the infrastructure services for delivering the application service to the clients.

The operation of the roaming daemon may be based on a profile for a server instance. It may comprise definitions like, e.g.:
  a trusted software vendor list (e.g., only the same vendor or vendor1, vendor2, . . . ),
  reserved computation resources (e.g., 20% CPU, 20% disk, 10% network),
  an engagement type (optimize performance, only disaster recovery, . . . ),
  a billing threshold (e.g., only engagements less than e.g., 0.1$ for performance and 0.5$ for disk space).

Based on such profiles, the roaming daemon may select to which other servers, e.g., server 210, connections may be established.

Another pluggable component on the client side, called SERVICE_DISPATCHER, is managing the computation/network reservation profiles for each client and the incoming and/or outgoing connections from other peer agents.

As shown, a second client 212 may be in communication with the second server 210 in the datacenter 2 208 receiving application service B, while the first client running the first agent 206 receives application service A from the first server 204.

So, if, e.g., the first agent 206 moves to a different geographical location, e.g. Asia, or experiences connection issues, the first server can look for delegation of the service request to a datacenter closer to the first agent 206 engaging a server, e.g. the second server 210 satisfying its configuration policies defined in the profile. These policies can be associated to a different level of service agreement (SLA) that at datacenter level or more likely at software vendor instance level requires different level of service management. So, e.g., a specific tenant of the data center, e.g., a software vendor, associated to a GOLD service contract with the relevant datacenter will be managed with higher priority than a SILVER or BRONZE contract and also can be associated to different billing thresholds to be charged to a service requestor, like the first agent 206 or the second agent 212. These SLAs may be managed by the roaming daemon on the involved servers 204, 210 and confirmed with specific acknowledgement messages with the SERVICE_DISPATCHER running together with the agents on the clients or a separate module alongside with the related agent.

Figure 3:
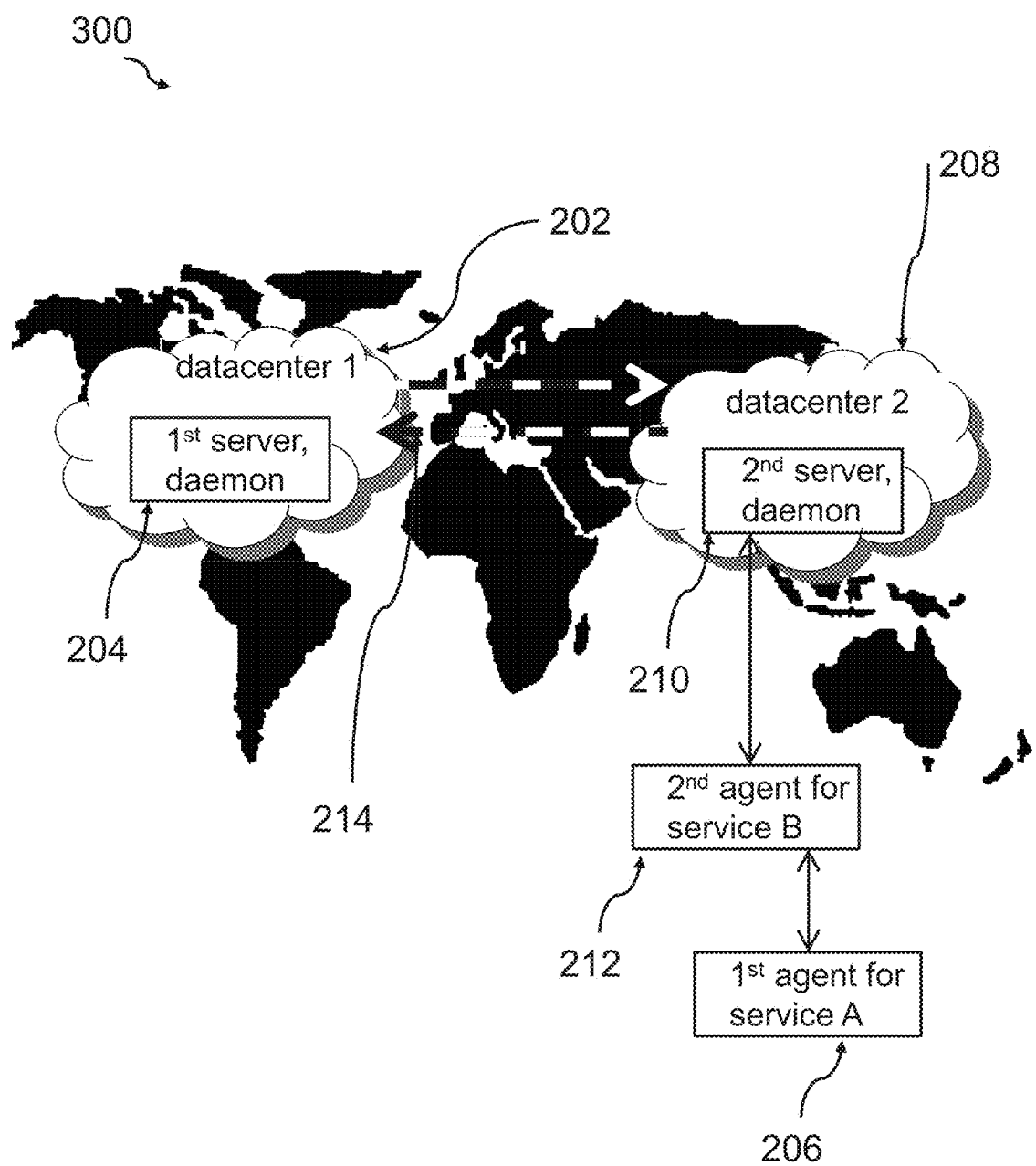
FIG. 3 shows a block diagram of an arrangement of clients and servers in roaming mode.

FIG. 3 shows a block diagram 300 of an arrangement of clients and servers in roaming mode. Here, the first client with the first agent 206 has moved to a different geographical location, e.g. Asia.

The engaged first server 204 will select among its clients a suitable proxy, e.g. the second agent 212 and provide it with the connection info of the first agent, so that it can directly contact it, forwarding the information coming from its original first server 206. Those service roaming activities are performed by the SERVICE_DISPATCHER of the second client/second agent 212 that will receive together with the required service the associated service level to manage potential multiple requests coming from different other clients with the right priority. In case of a potential risk on SLA compliance or real time data not aligned to expected performances, the first agent 206 request can be redirected to a different dispatcher, i.e. different second server 210.

It may be noted that the first server 204 in the first datacenter 202 running an instance of the roaming daemon and the second server 210 in the second datacenter 208 running another instance of the roaming daemon are in communication to each other, illustrated by black/white dashed lines 214 between the datacenters 1 and 2, 202 and 208. These communication lines may allow for a fast, reliable, high speed connection between the involved servers with a guaranteed bandwidth different to the public Internet typically used to connect clients.

Obviously, since the already performed authentication between first agent 206 and the first server 204, all additional information exchanged can be encrypted with a key only known between the two parties—i.e., the first agent 206 and the first server 204—and all information/data coming across other servers—e.g. server 210 and the second agent 212 are encrypted for privacy and confidentiality reasons.

So, in summary, a typical logical flow may be as follows:

The first SaaS server 204 defines its profile for $3^{rd}$ party requests

A first client 206 connected to the first server 204 either changes location or experiences connection issues.

The first server 204 may look for a service supplier based on its configuration and profile.

A service supplier is selected based also on the associated SLA.

It turns out that the second server 210 can fulfill the request of the first client 206.

The second server 210 notifies one of the entitled clients for service requests, e.g., the second agent 212 on the second client.

Once an acknowledgement is received from the first agent 204 the requests/service/data flow will follow the alternative route via the second client 212 and the second server 210 to the first server 204 having by design better performances.

If the first agent is moved back to its original place and the original connection restored, the original connection configuration is used again and a billing mechanism—compare compensation procedure mentioned above—is initiated.

According to a more complex embodiment, instead of specific billing each server can create some credits that can be used in the opposite scenario when the second server 210 is the one requiring in form for an alternative route.

Figure 4:
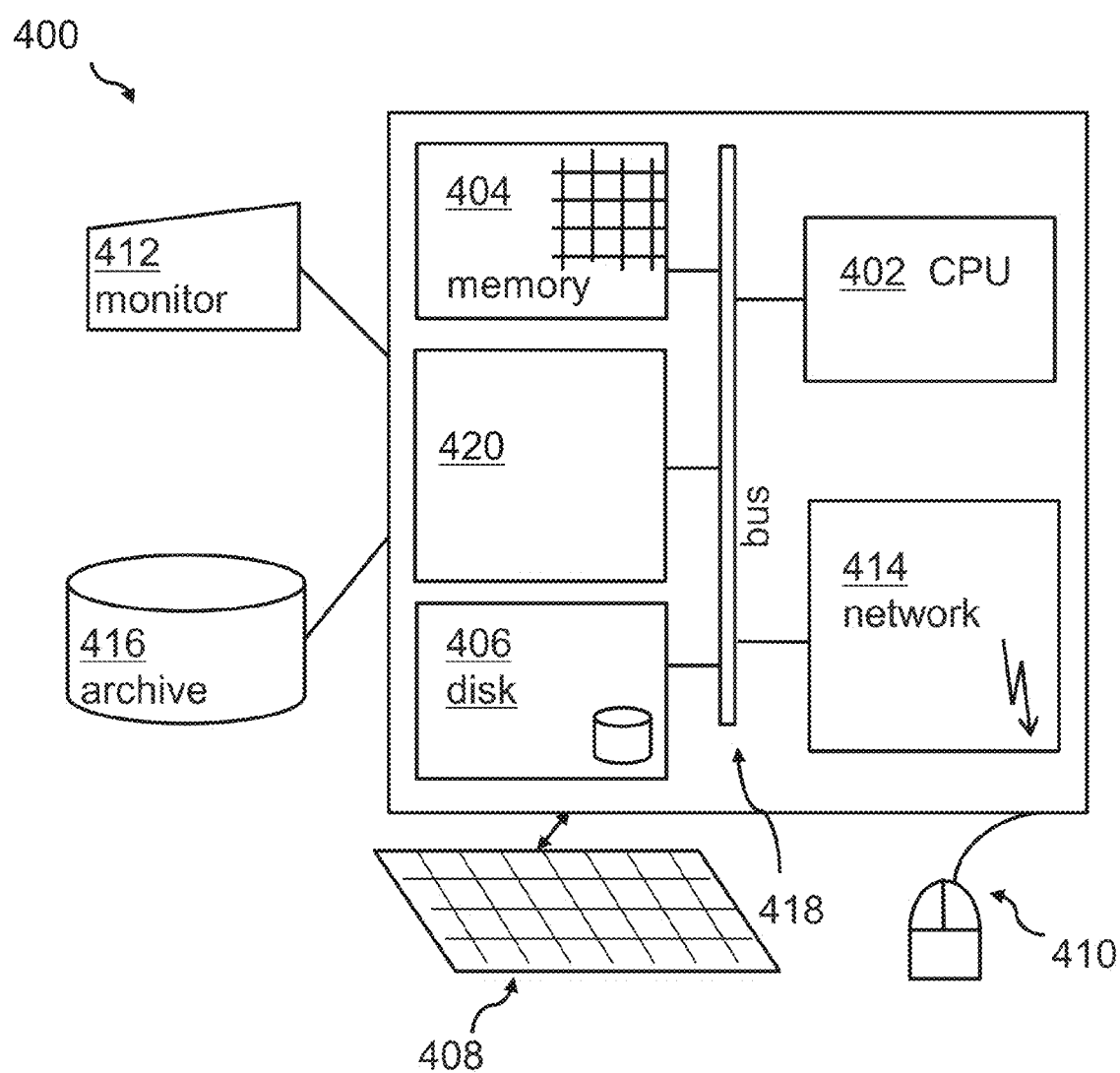
FIG. 4 shows an embodiment of a computing system comprising building blocks for the inventive system.

Embodiments of the invention may be implemented together with virtually any type of computer, regardless of the platform being suitable for storing and/or executing program code. For example, as shown in FIG. 4, a computing system 400 may include one or more processor(s) 402 with one or more cores per processor, associated memory elements 404, an internal storage device 406 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 404 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 416 for an execution. Elements inside the computer 400 may be linked together by means of a bus system 418 with corresponding adapters. Additionally, the roaming daemon—if implemented in hardware—or the SERVICE_DISPATCHER—if implemented in hardware—may be attached to the bus system 418, as indicated by block 420. The shown computer system 400 may either be a generic model of the servers 204, 210 and/or the client systems running the agents 206, 212 and/or SERVICE_DISPATCHER.

The computing system 400 may also include input means such as a keyboard 408, a pointing device such as a mouse 410, or a microphone (not shown). Alternatively, the computing system may be equipped with a touch sensitive screen as main input device. Furthermore, the computer 400, may include output means such as a monitor or screen 412 [e.g., a liquid crystal display (LCD), a plasma display, a light emitting diode display (LED), or cathode ray tube (CRT) monitor]. The computer system 400 may be connected to a network [e.g., a local area network (LAN), a wide area network (WAN)], such as the Internet or any other similar type of network, including wireless networks via a network interface connection 414. This may allow a coupling to other computer systems, or a storage network, or a tape drive. Those, skilled in the art will appreciate that many different types of computer systems exist, and the aforementioned input and output means may take other forms. Generally speaking, the computer system 400 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for providing a roaming service to a first client, the first client being associated to at least one application service running on an associated virtual machine as a Cloud service via a primary route between the first client and the at least one application service, the method comprising:
    providing a first agent on the first client; and
    providing an alternative route to the primary route between the first client and the at least one application service utilizing a second agent running on a second client, wherein the alternative route is based on a set of preferences submitted by the first client, wherein a first server running the associated virtual machine executing the application service also runs a roaming daemon, the roaming daemon using a profile comprising at least one of a trusted vendor list, a reserved computation volume, an engagement type, a billing threshold, and a security level, and wherein different servers may be selected, according to the profile, to establish the alternative route.

2. The method according to claim 1, wherein the alternative route is used if the primary route does not comply with the set of preferences which are service level constraints.

3. The method according to claim 1, wherein providing the alternative route comprises using a second server as a roaming device not running the at least one application service and the associated virtual machine on a first server.

4. The method according to claim 3, wherein the first server and the second server each deploy a counter for counting routing services provided for alternative routes.

5. The method according to claim 1, wherein the set of preferences comprises rules for quality of service for a communication between the first client and the associated application service.

6. The method according to claim 1, wherein the second client is adapted to operate as a proxy for a route between the first client and the at least one application service.

7. The method according to claim 1, wherein a second server, in communication with the first server, also runs a roaming daemon.

8. A roaming system for providing comprising:
   a memory;
   a processor executing instructions stored in the memory to provide:
      a roaming service to a first client, wherein the first client is associated to at least one application service running on an associated virtual machine as a Cloud service via a primary route between the first client and the at least one application service;
   a second client, both the first and second client running an agent;
   a routing module adapted for providing an alternative route to the primary route between the first client and the at least one application service utilizing the second agent running in the second client, wherein the alternative route is based on a set of preferences submitted by the first client, wherein a first server running the associated virtual machine executing the application service also runs a roaming daemon, the roaming daemon using a profile comprising at least one of a trusted vendor list, a reserved computation volume, an engagement type, a billing threshold, and a security level, and wherein different servers may be selected, according to the profile, to establish the alternative route.

9. A computer program product comprising instructions embodied on a non-transitory computer usable medium and configured, when executed by a computer, to provide a roaming service to a first client, the first client being associated to at least one application service running on an associated virtual machine as a Cloud service via a primary route between the first client and the at least one application service, by performing steps of:
   providing a first agent on the first client; and providing an alternative route to the primary route between the first client and the at least one application service utilizing a second agent running on a second client, wherein the alternative route is based on a set of preferences submitted by the first client, wherein a first server running the associated virtual machine executing the application service also runs a roaming daemon, the roaming daemon using a profile comprising at least one of a trusted vendor list, a reserved computation volume, an engagement type, a billing threshold, and a security level, and wherein different servers may be selected, according to the profile, to establish the alternative route.

10. The method according to claim 1, wherein the roaming daemon uses a profile comprising a trusted vendor list and a reserved computation volume.

11. The method according to claim 1, wherein the roaming daemon uses a profile comprising a reserved computation volume and an engagement type.

12. The method according to claim 1, wherein the roaming daemon uses a profile comprising an engagement type and a billing threshold.

13. The method according to claim 1, wherein the roaming daemon uses a profile comprising a billing threshold and a security level.

* * * * *